United States Patent [19]

Leonard

[11] 4,311,080
[45] Jan. 19, 1982

[54] DRIVE MECHANISM

[75] Inventor: Ian C. A. Leonard, Bolton, England

[73] Assignee: National Research Development Corporation, London, England

[21] Appl. No.: 808,347

[22] Filed: Jun. 20, 1977

Related U.S. Application Data

[62] Division of Ser. No. 748,402, Dec. 8, 1976.

[30] Foreign Application Priority Data

Dec. 10, 1975 [GB] United Kingdom ............... 50546/75

[51] Int. Cl.³ .......................... D04C 3/02; D04C 3/06; H02K 41/02
[52] U.S. Cl. .......................................... 87/44; 87/29; 87/50; 310/13
[58] Field of Search .................. 310/10, 40 R, 12–14; 87/44–46, 28–30, 50, 51, 33

[56] References Cited

U.S. PATENT DOCUMENTS

| | | | |
|---|---|---|---|
| 591,105 | 10/1897 | Shuttlesworth | 87/44 |
| 1,912,167 | 5/1933 | Anderson | 310/13 |
| 2,506,315 | 5/1950 | Petersen | 87/44 |
| 2,870,349 | 1/1959 | Rosenberg et al. | 310/13 |
| 2,993,130 | 7/1961 | Laithwaite | 310/13 |
| 3,194,032 | 7/1965 | Von Brimer | 310/13 X |
| 3,470,828 | 10/1969 | Powell, Jr. et al. | 310/13 X |
| 3,681,630 | 8/1972 | Sutton | 310/13 X |

Primary Examiner—John Petrakes
Attorney, Agent, or Firm—Cushman, Darby & Cushman

[57] ABSTRACT

A drive mechanism for driving one or a plurality of displaceable elements around a closed path, such as a circle, constituted by a linear induction actuator associated with means for constraining the displaceable elements to move in the closed path. A capacitive feedback control system determines the position of the element or elements around the path and controls the windings of the linear induction actuator in dependence on an error signal generated therefrom. An open path drive mechanism having a plurality of linear induction actuators and a capacitive feedback control system is also encompassed by the invention as are hybrid linear induction motors using sets of arcuate linear induction actuators around the rim of a reaction member which drives an output shaft of the motor.

17 Claims, 14 Drawing Figures

DRIVE MECHANISM

This application is a division of Ser. No. 748,402, filed Dec. 8, 1976.

BACKGROUND OF THE INVENTION

The present invention relates to drive mechanisms which are particularly suitable for driving one or more displaceable elements which is or are guided to move along or around a predetermined path. Embodiments of the present invention are particularly suitable for driving machines such as braiding machines, knitting machines, circular weaving machines and the like, although many other applications for the invention are envisaged.

One problem which is frequently encountered in industry is that of driving a plurality of displaceable elements along or around a fixed path. The difficulty of driving such elements along or around the fixed path is mainly due to the problem of transmitting the drive to the elements. For example, in the case of braiding machines, it is required to move a number of carriages or spool carriers around a circular track. The carriages may occupy up to 75% of the track and it is essential that they are maintained at a regular spacing. In conventional machines drive is transmitted to the circulating carriages by various mechanical means, such as by cams engaging in cam tracks, by a plurality of gears spaced along the circular path, or by a plurality of picks, which are weighted levers spaced along the side of the path which the carriages are to follow, and which engage with a part of the carriages to move these a given distance along the track. Such known machines, however, are very noisy in operation, and they generate a considerable vibration, and out-of-balance forces causing wear of the rubbing parts, which limits the maximum speed at which they can be operated to a speed lower than that which is required for modern production.

The carriages circulating around the track of a braiding machine must be rotated at constant relative speeds so that their relative spacing is maintained. In one known type of machine there are two sets of carriages which are caused to move in a sinuous circular path representing that of the dancers around a maypole. In another known machine, the filaments which are to be interwoven with those carried by the carriages are carried on spools mounted on a disc which is rotated, with respect to the circulating carriages, in the opposite direction, the filaments from the disc mounted spools being guided over and under the filaments from the spools of the carriages by means of tube guides, known in the art as "wands". These wands lift the filaments to positions that clear the spools of the carriages as they pass, and then lower the filament between two adjacent carriages so that the next carriage passes over the filament guided by the wand.

Such braiding machines can be used for braiding any filamentary material and, as used in this Specification, the term "filament" will be understood to refer to any elongate thread, yarn or wire, whether nonfilament, multifilament, or fibrous form, which is suitable for braiding.

It is important for the proper operation of a braiding machine that the tension on the filaments should be maintained constant, as far as possible, and it should be possible to start up and slow down the machine while maintaining the relative spacings of the carriages on the track at all speeds.

OBJECTS OF THE INVENTION

It is one object of the present invention to provide a drive mechanism by which a plurality of individual displaceable elements can be driven along a predetermined path.

It is another object of the present invention to provide a drive mechanism by which at least one displaceable element can be driven along or around a predetermined path (not necessarily a closed path) in a selected manner within given positional limitations.

A further object of the present invention is to provide a drive mechanism for a plurality of displaceable elements by which the elements can be simultaneously driven along or around a given path while maintaining within reasonable limits a given spacing between them despite different forces which may act on individual elements.

Another object of the present invention is to provide a drive mechanism for driving at least one displaceable element along or around a given path, in which the drive to the displaceable element can be transmitted far more effectively and quietly than with any known type of intermittent mechanical drive mechanism.

SUMMARY OF THE INVENTION

The present invention, in one aspect, consists in a drive mechanism for driving at least one displaceable element to move around a closed path, in which there is provided at least one electrical winding of a linear induction actuator extending adjacent the said closed path and substantially entirely around it, and in which the or each displaceable element is formed or provided with a part serving as a reaction member which, when the winding or windings is or are appropriately energised, is driven around the said closed path.

The winding or windings of the linear induction actuator may form part of the guide for the displaceable element incorporating the reaction member, or may be located alongside such a guide for suitable magnetic coupling between the winding and the reaction member of the displaceable element.

In one embodiment of the invention, constructed for driving at least one displaceable element around a circular path the linear induction actuator is formed as a motor comprising a plurality of separate arcuate windings each disposed in a circle and each circumferentially separated by an air gap from adjacent windings but electrically connected thereto.

There may be provided a plurality of displaceable elements each incorporating a respective reaction member for cooperation with the primary winding of the linear induction actuator. Such an arrangement has particular advantages over the previously known mechanical arrangement since a linear induction actuator drives the reaction member at a speed related to the frequency of the alternating electric current applied to the primary winding, and to the number and physical dimensions of the pole pieces of those windings; thus all the reaction members and hence the displaceable elements, will retain their initial spacing when the machine is in operation in the absence of external forces. However, in practice irregular external forces are almost always present, and for this reason it is necessary to be able to control and position and/or the velocity of the element or elements as it or they moves or move along different parts of the track. For this reason it is necessary to have some means of detecting the position of a displaceable element along the track. To this effect it is preferred that the or each winding of the linear induction actuator has associated therewith at least one fixed transducer member having means for feeding an electrical signal thereto, the reactance between the fixed transducer member and the reaction member of the displaceable element providing an indication of the position of the displaceable element with respect to the winding or windings of the linear induction actuator. In fact, for practical reasons it is preferable that the or each winding of the linear induction actuator has at least two fixed transducer members associated therewith, the fixed transducer members being spaced apart in such a way that the reaction member or members of the displaceable element or elements passes or pass between them and the winding of the linear induction actuator in operation of the mechanism to vary the electrical capacitance between each fixed transducer member and a non-magnetic metal part of the housing in which the winding of the linear induction actuator is carried. There may additionally be provided means for locating the or each displaceable element in the position in which it stops when the drive is switched off if the fixed path lies in other than a horizontal plane, since when the magnetic field set up by the current in the primary winding of the linear induction actuator collapses there will no longer be any force on the elements which would then all move under gravity to the lowermost part of the track unless some locating means is provided.

The present invention can also be applied to drive mechanisms in which there are provided means for constraining at least two displaceable elements to move around respective substantially parallel closed paths, there being a winding or plurality of windings of a linear induction actuator interposed between the said two paths in such a way that when the winding or windings is or are appropriately energised the displaceable elements are driven around their respective closed paths in opposite directions from one another. For application to braiding machines, such a construction has particular advantages since such machines have two sets of contra-rotating spool-carrying carriages. The required constancy of separation, and synchronisation of the two sets of rotating carriages can be ensured, as with embodiments of the invention having only one displaceable element or set of displaceable elements on one fixed track, if there are provided means sensitive to the instantaneous value of the reactance between the fixed transducer members and the reaction member or members of the displaceable element or elements and operable to produce an electrical signal in dependence thereon which signal represents the actual position or positions of the displaceable element or elements around the path, means for providing at least one demand signal representing the desired position or positions of the displaceable element or elements, and means for comparing the demand and actual position signals to produce at least one error signal usable for controlling the position or positions of the displaceable element or elements over at least a part of the said path.

In another embodiment of the invention the or each displaceable element is constrained to move in a circle and is mechanically coupled to an output shaft whereby to drive the output shaft to rotate when driven around the said closed path upon energisation of the winding or windings of the linear induction actuator. The or each reaction member may be in the form of a disc of conductive material the peripheral portion of which is located closely adjacent the winding or windings of the linear induction actuator.

An embodiment of the present invention may also be constructed as a braiding machine incorporating a drive mechanism of the type hereinbefore defined, the displaceable elements being constituted by a first set of spool-carrying carriages constrained to move around a circular path, there being a second set of carriages also constrained to move around a circular path and carrying spools of filaments, and means for guiding filaments drawn from the spools of the first set over and under filaments drawn from the spools carried by the carriages of the second set, with respect to an axis passing through both centres of the circular paths of the first and second sets of carriages. In embodiments of the invention formed as braiding machines there are a plurality of separate arcuate windings having circumferential spacings sufficient to permit the passage therebetween of the filaments from the spools of the said first set of carriages. Likewise it is preferred that the second set of carriages also incorporate reaction members for cooperation with the primary winding of the linear induction actuator, the arrangement being such that the two sets of carriages circulate around the primary winding in opposite directions from one another.

The present invention also comprehends a linear induction actuator comprising a plurality of electrical windings extending closely adjacent a path along or around which at least one displaceable element of the actuator is constrained to move, the or each displaceable element having a reaction member on which, when the said windings are appropriately energised, is exerted a force driving the said displaceable element along or around the said path, the actuator including a plurality of position transducers spaced along or around the said path and incorporating fixed members having means for feeding an electrical signal thereto and means sensitive to the reactance between the said fixed members and the said reaction member or members of the or each displaceable element.

Other features and advantages of the present invention will become apparent from a consideration of the following description with reference to the accompanying drawings, of various preferred embodiments, which is provided purely by way of non-restrictive example.

DESCRIPTION OF THE PREFERRED EMBODIMENTS

Figure 1:
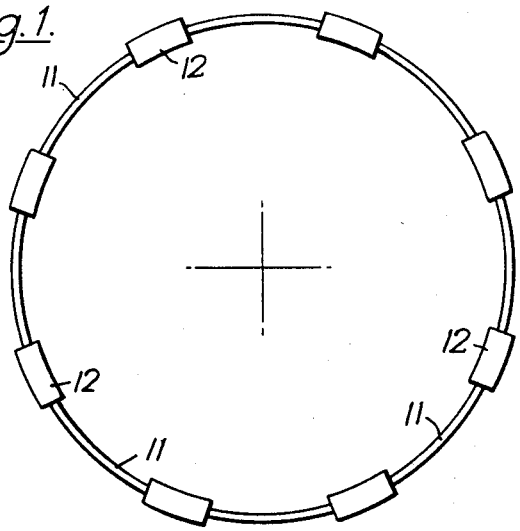
FIG. 1 is a schematic diagram showing a set of displaceable elements on a circular track.
Figure 2:
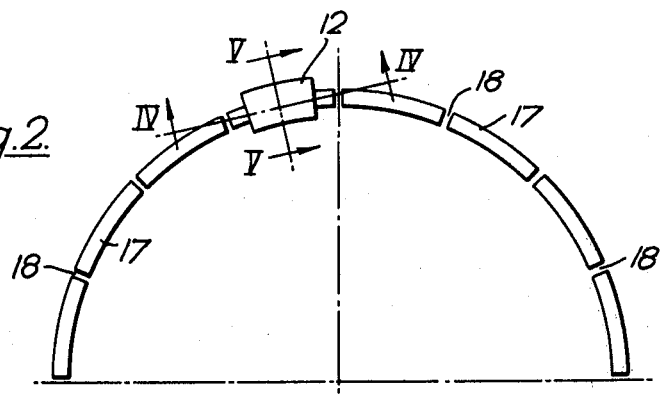
FIG. 2 is a diagram similar to that of FIG. 1, illustrating the use of a linear induction actuator for driving the displaceable elements, the linear induction actuator comprising a plurality of sections with circumferential gaps between each section.
Figure 3:
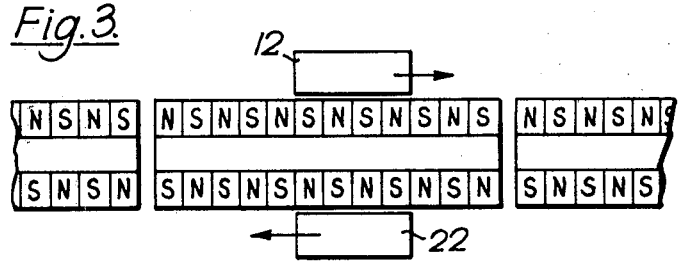
FIG. 3 is an enlarged view showing the pole structure in the arrangement of FIG. 2.

FIGS. 1, 2 and 3 illustrate schematically a circular drive mechanism suitable for use in a braiding machine. The basic requirements of a braiding machine drive are for two sets of spools mounted on carriages which constitute the displaceable elements mentioned above to be driven around a common centre, and for the filaments drawn from the spools of the set to be guided alternately over and under the filaments drawn from the spools of the other set. In FIGS. 1 to 3 there are shown a plurality of carriages 12 constrained to move around a circular path 11. Each of the carriages 12 must be equally spaced from its neighbours and all carriages must travel at precisely the same speed. The carriages are driven by means of a closed loop linear induction actuator assembly the primary winding of which is formed in a plurality of sections 17 each spaced from the neighbouring section by a circumferential air gap 18. Since the air gap 18 can be made relatively small (say in the region of half-inch) the guidance and drive transmitted from the section 17 of the primary windings to the reaction members carried by or formed as part of the carriages 12 is not seriously affected as the carriages traverse the circumferential gap. In FIG. 3 there is shown one section 17 of a linear induction actuator with a pole structure for driving carriages 12, 22 located on opposite sides of the windings in opposite directions from one another.

Figure 4:
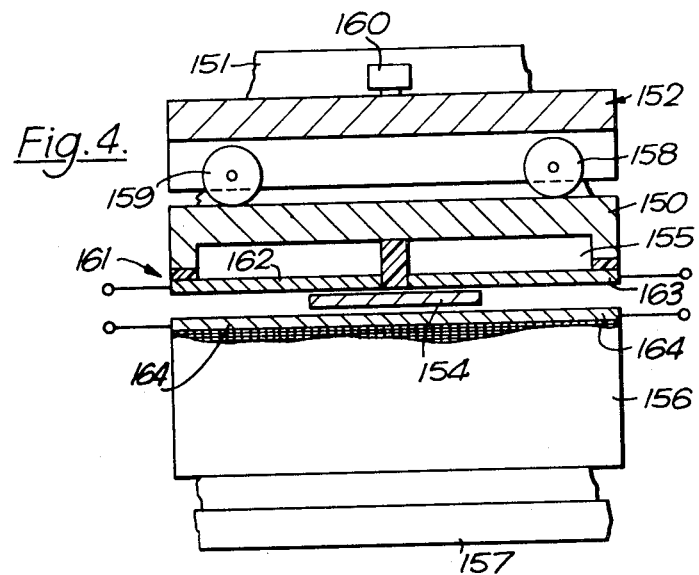
FIG. 4 is a schematic sectional view taken on the line IV—IV of FIG. 2.
Figure 5:
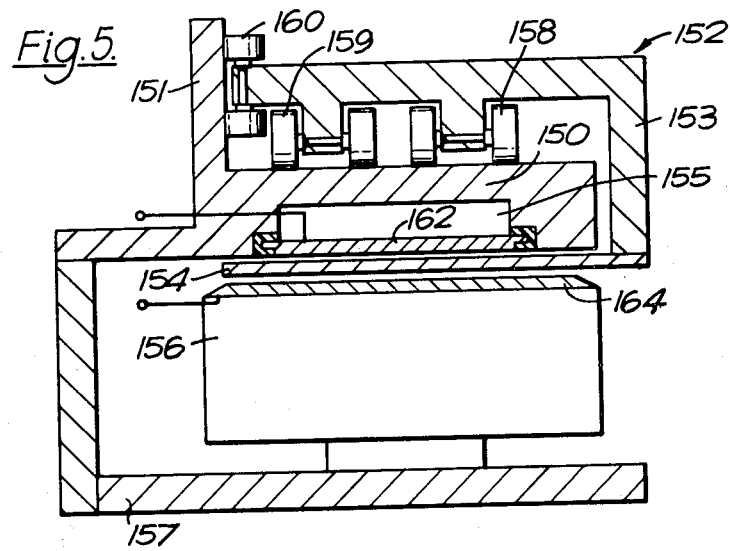
FIG. 5 is a schematic sectional view taken on the line V—V of FIG. 2.
Figure 6:
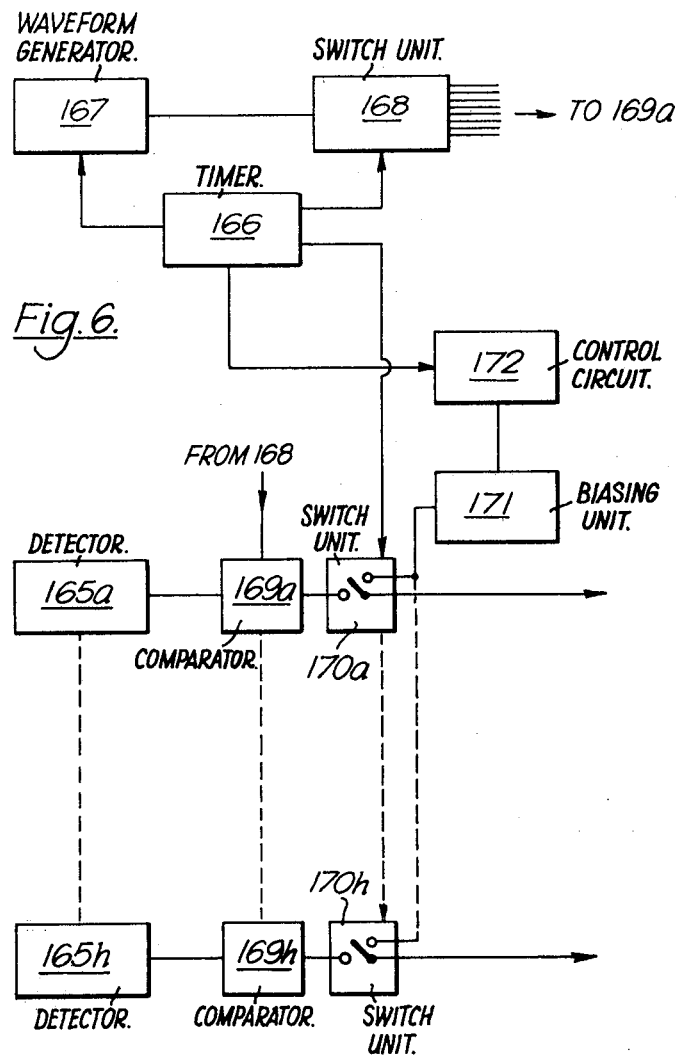
FIG. 6 is a schematic block diagram of a control circuit for the arrangement shown in FIGS. 1 to 5.

Referring now to FIGS. 4, 5 and 6 there is shown a construction incorporating means for controlling the carriages as they move around a circular track to maintain a fixed predetermined spacing. In the embodiment illustrated in these Figures the circular track lies in a horizontal plane and is constituted by a track base 150 having an associated upstanding wall 151 defining the outer peripheral boundary, and there are eight linear induction motor thrust units 156 spaced around the track 150 immediately beneath it. On the track 150 run eight carriages, generally indicated 152 each having a depending flange 153 which carries a substantially horizontal reaction plate 154 closely adjacent the underside of the track 150 and between this and the linear induction actuator windings 156 which are supported on a frame 157. The carriages 152 have a plurality of pairs of rollers 158, 159 running on the base 150 and also a plurality of pairs of rollers 160 which engage the upstanding peripheral wall 151 to constrain the carriage to move in the required circular path.

As shown more clearly in FIG. 4, each induction actuator 156 or thrust unit has an associated capacitive transducer, generally indicated 161, and constituted by two capacitor plates 162, 163 spaced above an upper nonmagnetic metal plate 164 of the casing in which the winding 156 is supported. The two capacitor plates 162, 163 are circumferentially spaced, insulated from one another, and are inset into the under surface of the base plate 150, as can be seen from FIG. 5, with a large air gap 155 behind them. The upper metal plate 164 of the thrust unit constituted by the actuator winding 156 is grounded. The reaction members 154 of the carriages 152 pass between the capacitor plates 162, 163 and the upper plate 164 of the thrust unit 156 with very small air gaps of the order of 1 millimeter so that the capacitance between each of the plates 162, 163 and the common plate 164 is varied as the reaction member passes through them. The common plate 164 may in fact be constituted by any non-magnetic metal part of the thrust unit 156: in the embodiment illustrated the unit 156 has an aluminum upper face which conveniently serves this purpose.

The capacitor plates can be connected to a suitable detector, for example in the form of a bridge circuit, so that the relative capacitance between the two capacitor plates 162, 163 and the plate 164, can be used to determine at what point along the length of the thrust unit 156 the reaction member 154 is located. Feedback systems for determining the position of the reaction member in a linear induction actuator are discussed in greater detail in British Pat. No. 1519953.

In order to drive the carriages around the track in a controlled manner, maintaining the spacing between these carriages, the feedback signal derived from the capacitive transducers is used to generate an error signal by referring it to a waveform representing the output of the capacitors which would be produced if the reaction members were all equally spaced and travelling at the same speed, and then modifying the drive signal fed to the winding of the thrust unit 156 to accelerate or decelerate the reaction member in accordance with its detected position. In the embodiment shown, because the carriages are closely spaced on the track, each of the thrust units 156 will only have a single reaction member in its field of influence for approximately half of the time it takes for the reaction member to traverse the thrust unit; for the remainder of the time the reaction member of the previous carriage or the successive carriage will also be within the field of influence of the thrust unit and this will lead to indeterminacy in relation to the position of the reaction member under consideration since any change in the capacitance between the plates 162, 163 and the plate 164 cannot necessarily be attributed to error in the position of the reaction member 154, but may be due to an error in the position of the preceding or succeeding reaction member. For this reason it is proposed that control of the thrust units 156 will be effected only during those periods in which only one reaction member is within the field of influence of any one thrust unit, and a bias forward or reverse thrust signal fed to the units for the remaining half of the time.

FIG. 6 illustrates a suitable circuit for this purpose. The circuit comprises a timer 166 which controls a waveform generator 167 which generates as an output signal the waveform which, when the carriages are moving in the desired manner, would be produced from the capacitive transducer comprising the plates 162, 163 and 164 and any following bridge circuit and/or phase sensitive detector to which the outputs from the capacitor plates may be fed; such circuits will be familiar to those skilled in the art and therefore will not be discussed in greater detail here. The output from the waveform generator 167 is fed to a switch unit 168 which, since in this embodiment there are eight thrust units 156, has eight output lines respectively connected to eight comparator circuits 169a–169h which are also fed with the output signals from detector circuits 165 associated with the eight capacitive transducers 161 incorporating the capacitor plates 162, 163, and 164, as discussed above. The outputs from the comparator circuits 169 are fed to respective switch units 170a–170h which are controlled by the timer 166 to permit the error signal to pass during those time periods when only one reaction member is within the field of influence of each thrust unit 156 and to switch over to an alternative position during the remainder of the time. In the alternative position of the switch units 170 a bias signal is fed thereby from a biasing unit 171 to the output lines which feed the thrust units 156. The bias unit provides a constant signal which is fed to all the thrust units 156 when the switches 170a are in the appropriate position so that all the reaction members experience the same forward or reverse thrust. A control circuit 172 for adjusting the output of the bias unit 171 is also provided and this may be controlled by the timer to provide a varying bias signal with time to compensate, for example, for changes in speed of the drive system.

Figure 7:
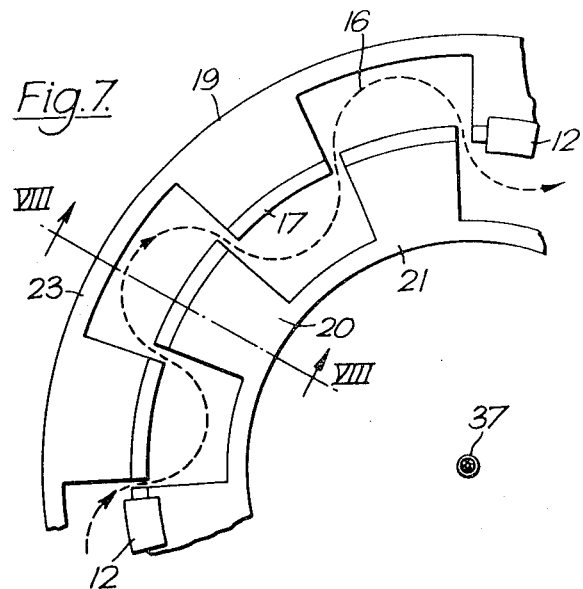
FIG. 7 is a schematic diagram illustrating a part of a practical embodiment of a braiding machine incorporating linear induction actuators for driving the carriages.

Referring now to FIG. 7 there is shown one practical arrangement by means of which the sections of primary winding of a linear induction actuator can be mounted in fixed positions with the required air gaps between each section leaving suitable spacing for the cooperating braiding wire. For this purpose the sections 17 of the primary member of the linear induction actuator are mounted on appropriate frame elements 19 and 20 which are secured to external and internal frames 23 and 21 respectively in an alternating configuration as will be seen from FIG. 7. In this embodiment each of the sections 17 of the primary member of the linear induction actuator is formed in two parts to provide alternate opposing north and south poles along each section as illustrated in FIG. 3. In this way two sets of carriages 12 and 22 can be mounted one on each side of the primary winding of the linear induction actuator, and driven to circulate around the circular path in opposite directions when the primary member of the linear induction motor is supplied with the current.

Figure 8:
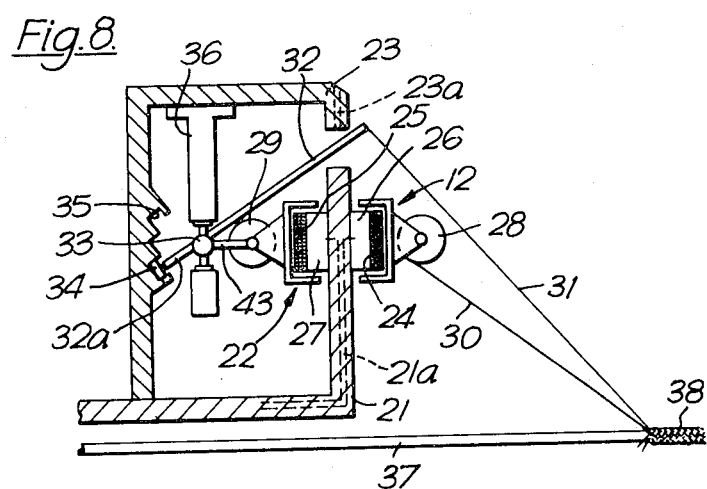
FIG. 8 is a cross-sectional view taken on the line VIII—VIII of FIG. 7.

As shown in FIG. 8 the primary member comprises respective windings 24, 25 mounted on frame parts 26, 27 on radial flanges of an internal frame 21 and an external frame 23 respectively. The carriages 12 which have suitable wheels or rollers (not shown) to facilitate their movement, each have respective wire spools 28 from which wires 30 are drawn to wrap around a cable 37 to form braiding 38 with cooperating wires 31 drawn from a spool 29 on the carriage 22. The wire 31 is guided through the gaps 18 between adjacent sections 17 of the primary member of the linear induction actuator by means of a guide tube or "wand" 32 through which the wire 31 passes. The wand 32 is mounted on a pivot 33 carried by a support 43 on the carriage 22. The pivot 33 is located at an intermediate position along the wand 32 so that a projecting portion 32a extends away from the carriage 22. This projecting portion carries a transverse wheel 34 which engages in a cam track 35 which has a suitable form to direct the wand 32 through the gaps 18 between adjacent sections 17 of the linear induction motor. One advantage of this construction is that due to the relatively large spaces between adjacent sections 17 of the linear induction motor and either the external frame or the internal frame, the path of the end of the wand 32 from which the wire 31 is drawn can be substantially sinusoidal so that the accelerations and decelerations of the wand are minimised thereby minimising the forces thereon.

It can be seen that the external and internal frames 23, 21 respectively have internal passages 23a, 21a therein to carry a coolant fluid which will be required in view of the fact that the carriages, if the maximum number are used, may occupy up to 75% of the track so that the air circulation caused by the movement of the carriages may not be sufficient adequately to cool the primary member of the linear induction motor. Of course appropriate cooling fins would also be provided.

Figure 9:
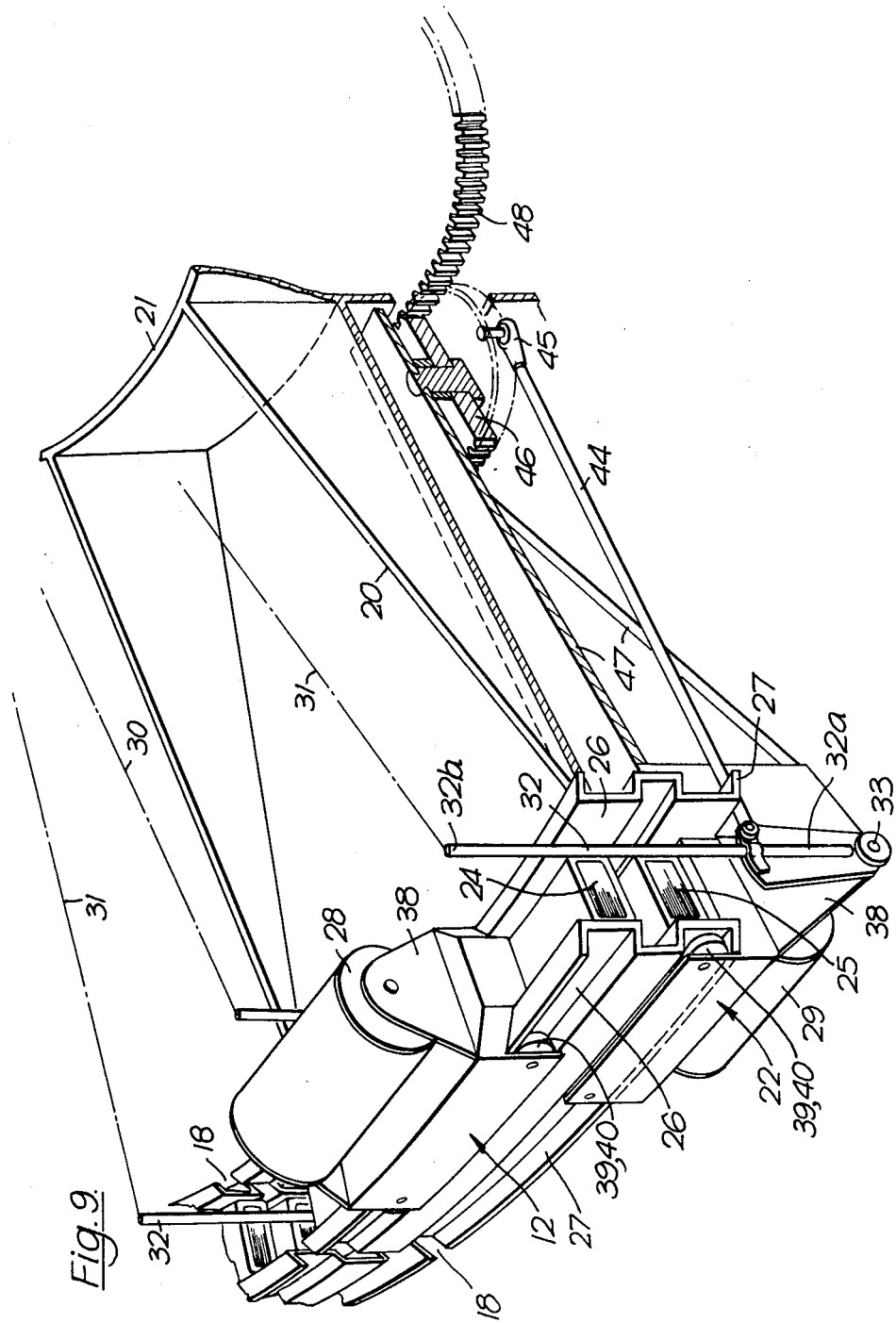
FIG. 9 is a perspective view of an alternative construction for effecting wand movement.

FIG. 9 illustrates an alternative construction in which a wand 32, pivoted at one end 33 on a carriage 22 is driven to move through reciprocating angular movement by a link 44 connected to an eccentric pin 45 on a gear wheel 46 carried by a fixed arm 47 secured to the carriage 22. The gear 46 rolls over and meshes with a fixed gear ring 48 carried on the frame of the machine. The relative radii of the gear 46 and the fixed gear ring 48 are selected so that the gear 46 makes the same number of rotations about its own axis as there are sections 17 of the primary member, as it traverses around the fixed gear ring 48 on movement of the carriage 22. As it rotates around its own axis the gear 46 causes the connecting rod 44 alternately to draw radially inwardly and then push radially outwardly the wand 32 thereby causing this to reciprocate angularly so that the wand tip 32b from which the wire on the carriage 22 is drawn follows an effectively sinusoidal path.

Figure 10:
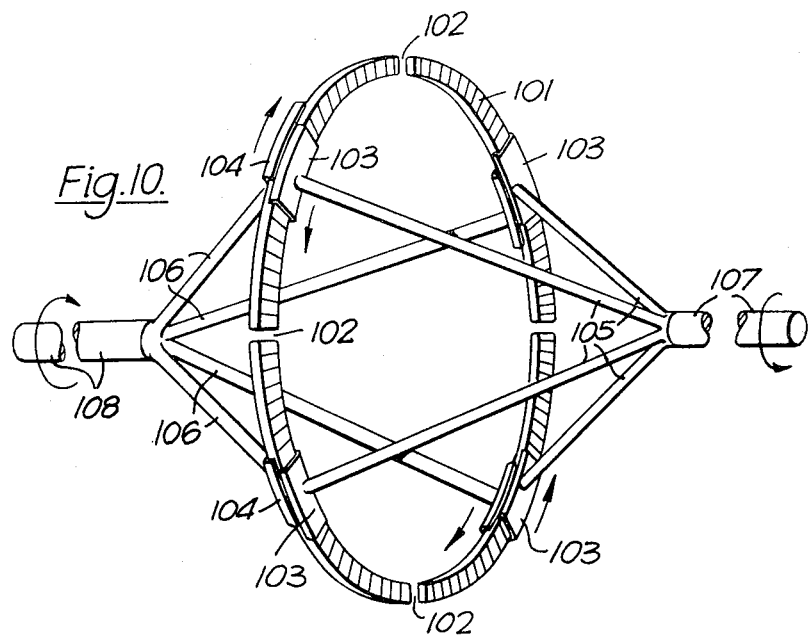
FIG. 10 is a perspective schematic view of a rotary twin linear induction motor having contra-rotating output shafts.

Referring now to FIG. 10 there is shown, schematically, a construction for a general purpose circular linear induction motor assembly having oppositely directed contra-rotating output shafts. Such a hybrid drive motor construction could be used for a variety of applications, for example in textile machines, machine tools or the like, or in other special purpose machines where two synchronous drives are required. The motor generally illustrated in FIG. 10 comprises a set of four back-to-back linear induction motor primary windings 101 each extending through an arc of approximately 90°, and each being separated from its neighbours by a very short air gap 102. In other embodiments there may be more or less than the four windings shown in FIG. 10.

Positioned for movement around the circular path defined by the primary windings 101, on each side thereof, are two sets each of four reaction plates 103, 104. The reaction plates 103 are connected by rigid generally radial spokes 105 to one end of a shaft 107 which is mounted for rotation about its own axis by means not shown in the drawing. Likewise, the reaction plates 104 are connected by respective spokes 106 to one end of a shaft 108 which is coaxial with the shaft 107 and, again, mounted for rotation about its own axis. The primary windings 101 of the linear induction motor sections are fed with current by known means (not shown) and the moving magnetic field so created causes the reaction plates 103 and 104 to move along the linear induction motor sections in opposite directions. The air gaps 102 are sufficiently small not seriously to affect the movement of the reacton plates as they pass, and the reaction plates 103, 104 can, moreover, be offset from one another in such a way that only one reaction plate is crossing an air gap 102 at any one time in order to minimise the effect of the air gaps.

Figure 11:
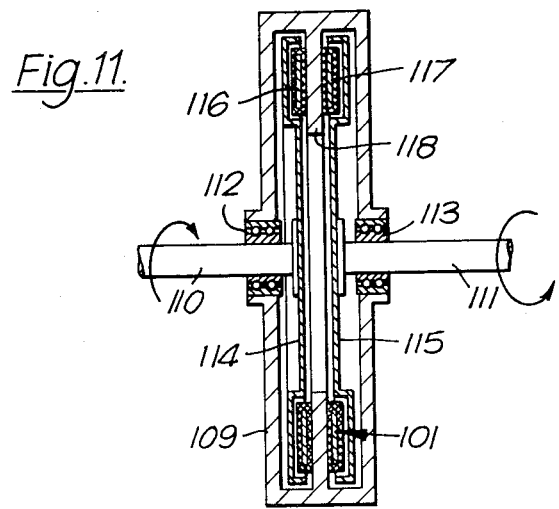
FIG. 11 is an axial section of an alternative construction for a circular twin linear induction motor having oppositely directed contra-rotating shafts.

FIG. 11 shows a similar arrangement in which the motor is constructed to be as flat as possible. In this arrangement a casing 109 carries two coaxial shafts 110, 111 in respective bearings 112, 113. On the one end of the shaft 110 there is rigidly connected a transverse disc 114 and a transverse disc 115 is rigidly fixed to the end of the shaft 111. The peripheral portions of the discs 114, 115 are formed with respective annular recesses to enclose annular windings 116, 117 of a back-to-back linear induction motor primary winding carried on a radially inwardly directed flange 118 of the casing 109 of the motor. Again, as the linear induction motor primary windings 116, 117 are supplied with current, they cause the reaction plates 114, 115 to turn in opposite directions thereby driving the shafts 110, 111 in opposite directions at the same synchronous speed.

Figure 12A:
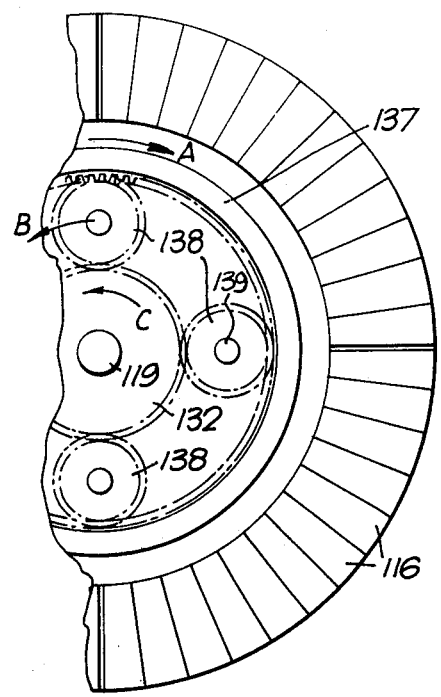
FIGS. 12a and 12b show a construction for a circular twin linear induction motor having a single output shaft driven via an epicyclic gear.
Figure 12B:
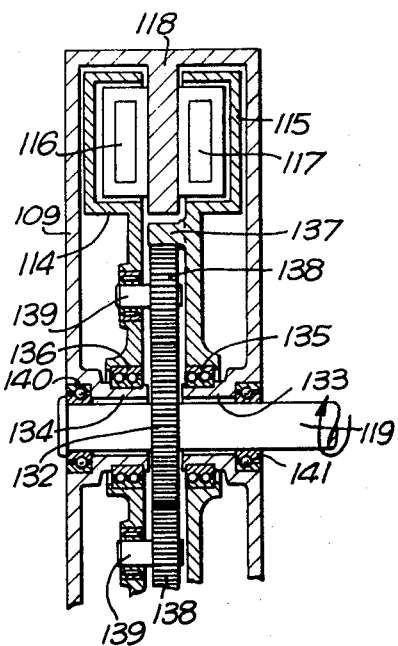

Referring now to the embodiment of FIGS. 12a and 12b, there is shown a flat hybrid electric motor having a single output shaft 119. The motor has a casing 109 with a radially inwardly directed flange 118 carrying back-to-back linear induction motor primary windings 116, 117 which react with cooperating reaction plates 114, 115 causing them to rotate in opposite directions. The reaction plates 114, 115 are carried on respective bearings 136, 135 on respective axial inward lips 134, 133 of the casing 109, and the output shaft 119 is carried on respective bearings 140, 141 on the casing 109.

The output shaft 119 carries a pinion 132 as a sun gear which meshes with a plurality of planet gears 138 carried on respective shafts 139 by the reaction plate 114. A ring gear 137 meshes with the planet gears 138 and is rigidly carried by the reaction plate 115.

Upon energisation of the windings 116, 117 causing contra-rotation of the reaction plates 114, 115, the ring gear 137 is caused to rotate in one direction, as shown by the arrow A and the planet gears are caused to rotate in the opposite direction as shown by the arrow B. Both of these movements cause rotation of the sun gear in the direction of the arrow C, and in this way the contra-rotation of the reaction plates 114, 115 is turned into rotation in a single direction of the single output shaft 119, all the power from the linear induction motor windings being used for this drive. The advantage of this arrangement is that shaft rotation speeds considerably greater than those of normal induction motors can be attained by the choice of suitable gears in the epicyclic train, and this makes the motor very suitable for applications such as high speed fans.

Figure 13:
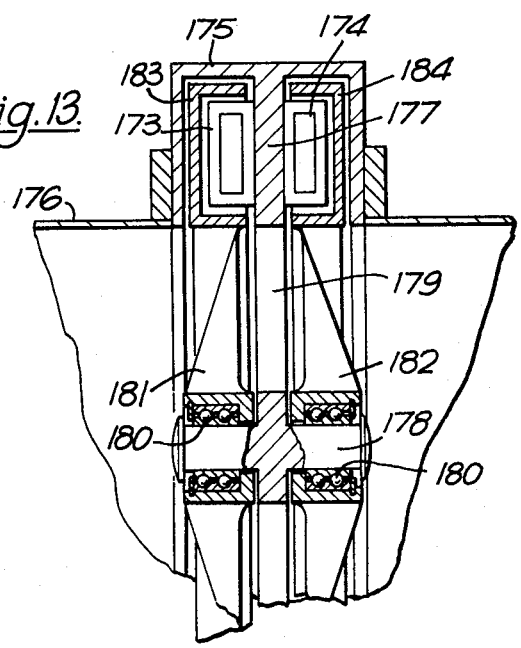
FIG. 13 is a partial axial section of an embodiment of the present invention constructed as a fan.

In FIG. 13 there is shown a construction similar to that of FIG. 11, which is particularly adapted as a fan. In this embodiment two sets of linear induction actuators 173, 174 are supported on an annular housing 175 which can be located, for example, in a duct generally indicated 176.

The annular housing 175 has a radially inwardly projecting central flange 177 to which is connected a central hub 178 by four radial arms 179. Carried on the hub 178 by bearings 180 are two rotors 181, 182 formed with a plurality of fan blades in their radially inner parts and channel section annular outer rings 183, 184 which are positioned between respective windings 173, 174 and the casing 175 to serve as reaction members by which drive induced by currents in the windings 173, 174 is transmitted to the fan rotors 181, 182. Other fan constructions, particularly incorporating gearing such as in the embodiment of FIGS. 12a and 12b, are also envisaged.

I claim:

1. A drive mechanism for driving at least one displaceable element to move around a closed path, comprising:
    means constraining the at least one displaceable element to move around said closed path;
    a linear induction actuator extending adjacent said closed path and substantially entirely around it, said linear induction actuator comprising a plurality of separate arcuate electrically interconnected windings separated circumferentially by respective air gaps; and
    a reaction member carried by said at least one displaceable element and extending circumferentially over part only of any one said winding, said reaction member cooperating with the linear induction actuator whereby when said linear induction actuator is appropriately energized, said at least one displaceable element is driven around said closed path.

2. A drive mechanism as in claim 1, wherein said support means comprise at least one guide carried by the linear induction actuator and a carriage engaging said guide and carrying said displaceable element.

3. A drive mechanism as in claim 1, wherein there are provided:
    at least two said displaceable elements,
    means for constraining said two displaceable elements to move around respective substantially parallel closed paths,
    said linear induction actuator being interposed between said two paths,
    said linear induction actuator having two sets of windings such that when said windings are appropriately energised said at least two displaceable elements are driven around their respective closed paths in opposite directions from one another.

4. A drive mechanism as in claim 1, wherein there are provided:
    cooling means for cooling the windings of said linear induction actuator so as to supplement any cooling effect due to the motion of said at least one displaceable element.

5. A drive mechanism as in claim 1, wherein said windings of said linear induction actuator are wound on a hollow core through which a coolant can be pressed in use of the drive mechanism.

6. A drive mechanism as in claim 1 wherein said at least one displaceable element is constrained to move in a circle,
    means mechanically coupling said at least one displaceable element to an output shaft whereby to drive said output shaft to rotate when said at least one displaceable element is driven around said closed path upon energisation of said linear induction actuator.

7. A drive mechanism as in claim 6, wherein there are:
    two sets of windings of said linear induction actuator disposed back-to-back in a circle,
    two sets of displaceable elements, and
    two output shafts connected to respective sets of said displaceable elements, whereby said shafts rotate in opposite directions when said windings are energised.

8. A braiding machine incorporating a drive mechanism as in claim 1, including a first set of carriages formed by a plurality of displaceable elements;
  means constraining said first set of carriages to move around a circular path;
  a second set of carriages;
  means constraining said second set of carriages to move around a circular path;
  a plurality of spools of filaments carried one on each of said carriages of said first and second set;
  means for guiding filaments drawn from said spools carried by said carriage of said first set over and under filaments drawn from said spools carried by said carriages of said second set, with respect to an axis passing through both centres of said circular paths of said first and second sets of carriages.

9. A braiding machine as in claim 8, wherein said linear induction actuator has a plurality of separate arcuate windings having circumferential spacings sufficient to permit the passage therebetween of said filaments from said spools carried by said first set of carriages.

10. A braiding machine as in claim 9, wherein said second set of carriages also incorporate reaction members for cooperation with the windings of said linear induction actuator, the arrangement being such that said two sets of carriages are driven around respective paths by said primary windings of said linear induction actuator in opposite directions from one another.

11. A braiding machine as in claim 8, wherein the windings of said linear induction actuator are wound on a support having ducts therein through which a coolant can be passed in use of the machine.

12. A braiding machine as in claim 8, wherein said means for guiding the filaments from said spools on said carriages of said first set comprise respective guide arms each having a filament guide at one end thereof, the position of said arms being controlled as said carriages of said first set travel around said path whereby to position said filaments appropriately.

13. A drive mechanism for driving at least one displaceable element to move around a circle, comprising:
  means constraining the at least one displaceable element to move around said circle;
  a linear induction actuator extending adjacent said closed path and substantially entirely around it, said linear induction actuator comprising a plurality of separate arcuate electrically interconnected windings separated circumferentially by respective air gaps;
  a reaction member carried by said at least one displaceable element in the form of a disc of conductive material, the peripheral portion of which is located closely adjacent the windings of said actuator, said reaction member cooperating with the linear induction actuator whereby when said linear induction actuator is appropriately energized, said at least one displaceable element is driven around said circle; and
  means mechanically coupling said at least one displaceable element to an output shaft whereby to drive said output shaft to rotate when said at least one displaceable element is driven around said circle upon energization of said actuator.

14. A fan, comprising:
  means constraining at least one displaceable element to move around a circle;
  a linear induction actuator extending adjacent said circle and substantially entirely around it, said linear induction actuator comprising a plurality of separate arcuate electrically interconnected windings separated circumferentially by respective air gaps;
  a reaction member carried by said at least one displaceable element and extending circumferentially over part only of any one of said winding, said reaction member cooperating with the linear induction actuator whereby when said linear induction actuator is appropriately energized, said at least one displaceable element is driven around said closed path; and
  a plurality of fan blades mounted on said displaceable element for rotation therewith.

15. A drive mechanism as in claim 13, wherein there is further provided:
  a drive shaft
  a ring gear, and
  a plurality of planet gears, drive from said at least one displaceable element being transmitted to said drive shaft via said ring gear and said plurality of planet gears.

16. A drive mechanism as in claim 15, wherein said ring gear is carried for rotation by said at least one displaceable element,
  a pinion gear carried for rotation by said output shaft of the device,
  said planet gears transmitting drive from said ring gear to said pinion gear.

17. A drive mechanism as in claim 16, wherein there are two displaceable elements in the form of discs, and two sets of windings of respective closed path linear induction actuators,
  one of said discs carrying said ring gear and the other of said discs carrying said planet gears, said two discs being driven to rotate in opposite directions by respective said windings of said linear induction actuators.

* * * * *